May 18, 1965     C. J. KOESTER     3,183,763
POLARIZATION ANALYZERS FOR OPTICAL SYSTEMS
EMPLOYING POLARIZED LIGHT
Filed Dec. 24, 1959     5 Sheets-Sheet 1

CHARLES J. KOESTER
INVENTOR.

BY
BLAIR, SPENCER & BUCKLES
ATTORNEYS.

CHARLES J. KOESTER
INVENTOR.

BY
BLAIR, SPENCER & BUCKLES
ATTORNEYS.

FIG. 7

CHARLES J. KOESTER
INVENTOR.

BY
BLAIR, SPENCER & BUCKLES
ATTORNEYS.

CHARLES J. KOESTER
INVENTOR.

BY
BLAIR, SPENCER & BUCKLES
ATTORNEYS.

United States Patent Office 3,183,763
Patented May 18, 1965

3,183,763
POLARIZATION ANALYZERS FOR OPTICAL SYSTEMS EMPLOYING POLARIZED LIGHT
Charles J. Koester, South Woodstock, Conn., assignor to American Optical Company, Southbridge, Mass., a voluntary association of Massachusetts
Filed Dec. 24, 1959, Ser. No. 861,980
29 Claims. (Cl. 88—14)

The present invention relates to polarization analyzers for optical systems employing polarized light, and particularly to analyzers adapted for use in identifying with ease and precision certain particular polarization states of this light, such as circularly polarized light, elliptically polarized light, and plane polarized light.

Polarized light is a useful experimental tool in polarimetry, photoelasticity, polarizing microscopes, and many other fields. In polarimetry, the light-modifying properties of substantially transparent experimental samples are measured, and these properties are also useful in identifying particular materials, in measuring solution concentrations, and the like. In photoelasticity, the light-modifying properties of the specimen vary in direct proportion to the elastic stress imposed upon the specimen and thus provide a convenient means for analyzing stress concentrations in the specimen. In polarizing microscopes and in certain types of phase microscopes, polarized light is employed to increase the visibility to the observer of structural and surface details of the specimen under observation. In interference microscopes, polarized light is employed in observing and measuring the optical properties of a specimen.

Polarized light optical systems generally include a light source, a polarizer element adapted to convert ordinary light into polarized light, and an analyzer element which is generally similar to the polarizer. For example, the analyzer and polarizer may be Nicol prisms, Glan-Thompson prisms, sheets of transparent polarizing material, or piles of angularly-inclined transparent plates. Different kinds of light-modifying elements and specimens are interposed in these systems to permit the study or measurement of the effects upon polarized light produced by a specimen having certain optical properties. Polarization rotation effects, phase retardation effects, light absorption effects and the like may thus be observed and measured in such systems.

With certain of these polarized light optical systems, the image viewed by the observer may be a mixed pattern of light and dark areas, such as that seen in polarizing microscopes and phase microscopes. In other such systems, particularly where a small segment of the specimen is under observation, the observer views an unmixed pattern of a light or dark area of the specimen, in which the intensity of light transmitted through the system bears a relationship to the light-modifying properties of the specimen being measured or studied.

An important problem encountered with many polarized light optical systems is that of identifying with precision the particular state of polarization of the emergent light. This light may be plane polarized at any azimuth, or it may be circularly polarized with either right-handed or left-handed circular polarization, or it may be elliptically polarized. Fixed analyzers and adjustable or rotatable analyzers have been employed in such optical systems to identify and measure the polarization state of the emerging light, but the accuracy available with such devices often depends on the visual sensibility of the observer in comparing and distinguishing the apparent light intensities in two fields or in different portions of the same field. When light-sensitive instruments such as photocells and photo-multiplier tubes are used to measure light intensities, precise determinations are often difficult because of "noise" produced by stray light passing through the optical system, or originating in the photocell or in the electrical apparatus employed in conjunction with such photosensitive devices.

Accordingly, a principal object of the present invention is to provide analyzing devices for polarized light optical systems adapted to achieve greater sensitivity and precision in determinations of polarization states than heretofore possible.

Another object of the present invention is to provide analyzing devices of the above character capable of identifying inclination azimuths of plane polarized light with precision.

A further object of the invention is to provide analyzing devices of the above character capable of identifying circularly polarized light with precision.

Another object of the invention is to provide analyzing devices of the above character capable of distinguishing right-circularly polarized light from left-circularly polarized light.

A further object of the invention is to provide analyzing devices of the above character adapted for use with polarized light of a plurality of wavelengths.

An additional object of the invention is to provide analyzing devices of the above character adapted for convenient incorporation in commercial apparatus employing polarized light optical systems.

Another object of the invention is to provide analyzing devices of the above character readily adapted for use with photoelectric systems in automatic control apparatus, data recording, or the like.

Still another object of the invention is to provide analyzing devices of the above character which are economical to manufacture and convenient to operate.

Another object of the invention is to provide phase-retarding elements for incorporation in analyzing devices of the above character which produce substantially the same amount of phase retardation in light of a plurality of wavelengths.

Other objects of the invention will in part be obvious and will in part appear hereinafter.

The invention accordingly comprises the features of construction, combinations of elements, and arrangements of parts which will be exemplified in the construction hereinafter set forth, and the scope of the invention will be indicated in the claims.

For a fuller understanding of the nature and objects of the invention, reference should be had to the following detailed description taken in connection with the accompanying drawings, in which.

Similar reference characters refer to similar parts throughout the several views of the drawings.

A beam of unpolarized light may be regarded as a mixture of many sine-wave vibrations oriented in many directions, each of which is perpendicular to the direction of propagation of the beam. A beam of polarized light may be regarded as containing only one such vibration oriented in one such direction which, together with the axis of propagation, defines the "polarization plane." Unpolarized light directed through a linear "polarizer" or "analyzer" emerges as plane polarized light vibrating only in planes parallel to the "polarization plane" of the polarizer or analyzer, since components normal thereto are extinguished by this element. Hence this direction normal to the polarization plane is called "extinction axis" of the polarizer or analyzer.

A phase difference between two mutually perpendicular plane polarized superimposed component beams makes the resultant vector revolve about the axis, and the length of the resultant vector generally changes during such revolution. The tip of this vector generally traces an elliptical path, and the resultant beam is therefore termed "elliptically polarized." If the components are of equal amplitude and the phase difference is 90°, the ellipse becomes a circle and the resultant beam is called "circularly polarized."

When a single beam of plane polarized light is directed through a body of "birefringent" material, the optical characteristics of the beam emerging from the material depend upon the relative orientation of the material and the incident beam as well as on the degree of birefringence and thickness of the material.

"Birefringent" materials are so named because they are "anisotropic," i.e. their optical properties depend on the angular direction at which the light travels through the crystal. In general, light of a given polarization travels through the crystal at a different velocity than light polarized perpendicularly thereto. In a uniaxial crystal there is one direction along which light of all polarizations travels with the same velocity. This direction is called the optic axis. In biaxial crystals such as mica there are two such directions and therefore two optic axes.

When a plane parallel plate is cut from uniaxial material, for light incident normally on the plate there is always one vibration direction which is perpendicular to the optic axis. This direction is then known as the "fast" axis if the crystal has positive birefringence. Perpendicular to this direction is the "slow" axis of the plate. If the crystal has negative birefringence, these axes are reversed. Similarly, a plate cut from a biaxial crystal will have a fast and a slow axis. With such plane parallel plates it is convenient to speak merely of the fast and slow axes, or the "principal axes," thus avoiding the use of the terms uniaxial, biaxial, positive birefringence, and negative birefringence.

Furthermore, if the optic axis of a uniaxial crystal is not parallel or perpendicular to the direction of light through the crystal, then light traveling through the crystal is separated into two beams—the ordinary and extraordinary beams—which vibrate in directions perpendicular to each other, and which not only travel at different velocities through the crystal but also follow different paths. For a discusstion of these phenomena, see Frotch, "Photoelasticity" (Wiley, 1941), Volume 1, pages 103–116.

If a ray of plane polarized light is directed into such birefringent material with its incident plane of polarization oriented at an angle of about 45° to the two normal principal axes, the beam may be regarded as divided into two components; each is polarized in a plane parallel to one of the principal axes, and one component will pass through the material more slowly than the other. When the material is a "half-wave" plate, i.e. a plate having a chosen thickness such that the relative retardation of this slower component is equal to one-half of the wavelength of the light, this has the effect of changing or "rotating" the plane of polarization of the emerging light by 90° with respect to the incident plane of polarization.

Similarly, a "quarter-wave plate," with its principal axis oriented at 45° to the plane of polarization of incident plane polarized light, introduces a one-quarter wavelength or 90° phase difference between the two components, thus converting plane polarized light into circularly polarized light.

The "retardation" provided by such phase-retarding elements as birefringent plates will be understood to mean the relative phase retardation produced by passage through the element between two component light beams, the slow component being polarized in a plane perpendicular to the fast axis of the element, and the fast component being polarized in a plane parallel to this fast axis.

Figure 1:
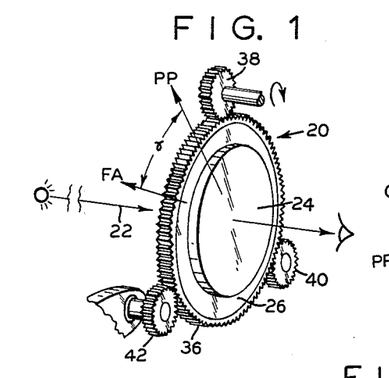
FIGURE 1 is a perspective view of a rotating analyzer assembly which is one embodiment of the present invention.

Integral analyzer assemblies of the present invention, including a phase retarding element having one or more parts together with an analyzer element, have been found to have great usefulness in the observation, identification, and measurement of the particular polarization states of polarized light, particularly when these analyzer assemblies are mounted for rotation. One form of rotating analyzer assembly is shown in FIGURE 1. Here the assembly generally indicated at 20 is interposed in a beam 22 of polarized light and includes an analyzer element 24 and a phase-retarding element 26 preferably mounted on or secured to the incident face of the analyzer 24. The analyzer element 24 is a "linear" analyzer producing plane polarized light, and it is preferably formed from a sheet of substantially transparent polarizing material, as indicated in FIGURE 1, although a Nicol or Glan-Thompson prism can also be used to form linear analyzer 24. The arrow PP and the beam axis 22, in FIGURE 1, together define the polarization plane in which light passing through the linear analyzer 24 is "plane polarized." The phase-retarding element 26 is preferably a sheet of substantially transparent birefringent material having its fast axis FA angularly displaced from the polarization direction PP of analyzer 24 by the angle $\gamma$.

Figure 2:
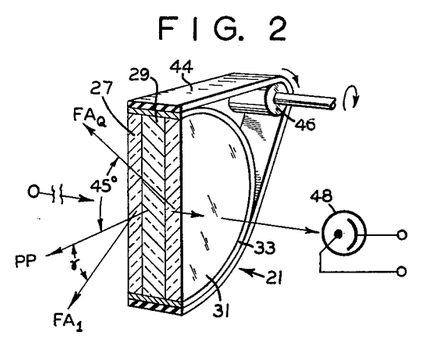
FIGURE 2 is a sectional perspective view showing another rotating analyzer assembly which is a modification of the embodiment of the invention shown in FIGURE 1.

A modification of this embodiment is shown in FIGURE 2, where the assembly generally indicated at 21 includes an incident phase-retarding element 27, an analyzer 29, and an emergent quarter-wave retardation plate 31 overcoming any polarization sensitivity of the photocell 48.

The phase-retarding elements of the present invention are interposed in the beam 22 before the incident face of analyzer 24 and preferably are secured to the incident face of the analyzer elements and mounted for integral rotation therewith. Thus in FIGURE 1 the elements 24 and 26 are secured together by cement or the like and mounted within a gear wheel 36, which is continuously driven by a driving pinion 38 and held in operating position by idler pinions 40 and 42. Again in the embodiment of FIGURE 2, the elements 27, 29, and 31 are similarly secured together and mounted within a rotatable ring 33 adapted for continuous rotation by such means as the belt 44 driven by a driving sheave 46. As indicated in FIGURE 1, light passing through the rotating analyzer assemblies of the present invention may be directly viewed by the observer, or this light may be directed upon a photocell or photomultiplier 48, as shown in FIGURE 2, which produces an output signal substantially proportional to the flux transmitted through the rotating analyzer.

In addition to the gear and belt drive arrangements illustrated in FIGURES 1 and 2, the rotating analyzer assemblies of the present invention may be driven by friction rollers or by being mounted as part of the rotor of a synchronous motor, or by any other suitable drive techniques.

Figure 11:
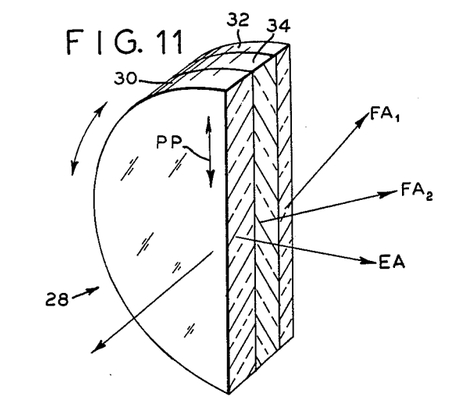
FIGURE 11 is a partial sectional perspective view of a part of an achromatic analyzer assembly which is one embodiment of the present invention, illustrating the orientation of the component elements.
Figure 13:
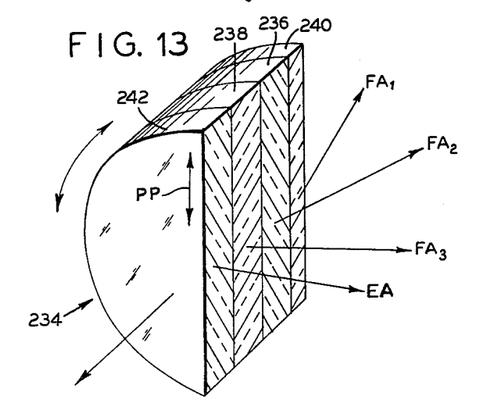
FIGURE 13 is a partial sectional perspective diagram illustrating the orientation of the separate elements of another achromatic analyzer assembly which is a further embodiment of the invention.

Another embodiment of the invention useful with light of a plurality of wavelengths is shown in FIGURE 11, where an analyzer assembly generally indicated at 28 includes a linear analyzer 30 and a phase-retarding element comprising two separate incident phase-retarding plates 32 and 34. A modification of this embodiment is shown in FIGURE 13, with an analyzer assembly generally indicated at 234 including a linear analyzer 242 and an incident phase-retarding element comprising three retardation plates, 236, 238 and 240.

When a beam of plane polarized light is incident upon the rotating analyzer assemblies of the present invention, the flux or light intensity of the light transmitted by the rotating analyzer assembly will generally fluctuate, varying through two cycles with each revolution of the rotating analyzer. The character of this fluctuating signal will vary, depending upon the retardation provided by the phase-retarding element included in the rotating analyzer combination and on the polarization state of the incident light.

The incident light beam 22 may generally be regarded as the resultant of two normally plane polarized components. If these components are equal and in phase with each other or out of phase by an even multiple of 90°, the resultant incident beam will be plane polarized in a plane oriented at a 45° angle between the planes of the respective component beams. If the two component beams are equal in amplitude but out of phase by exactly 90° or an odd multiple of 90°, the resultant beam will be circularly polarized. If the component beams are unequal in amplitude, or out of phase with each other by an amount different from either 90° or a multiple of 90°, the resultant beam will be elliptically polarized.

For perpendicularly plane polarized components which are equal in amplitude but out of phase by a certain amount, producing elliptically polarized light, the phase difference, $\epsilon$, between the two component beams is a measure of the ellipticity of the resulting elliptically polarized light. Thus when $\epsilon=0$, the incident light will be plane polarized; when $\epsilon=90°$, the incident light will be left circularly polarized, with the tip of the resultant vector tracing a counterclockwise circle as viewed by the observer; and when $\epsilon=-90°$, the incident light will be right circularly polarized. Differences in amplitude in component beams which are not precisely in phase with each other will produce corresponding apparent resultant phase differences $\epsilon$ which likewise serve to describe the amount of ellipticity in the resulting elliptically polarized light. Elliptical polarization may thus be produced by either phase differences or amplitude differences or both between two mutually perpendicular plane polarized component beams of light.

Figure 8:
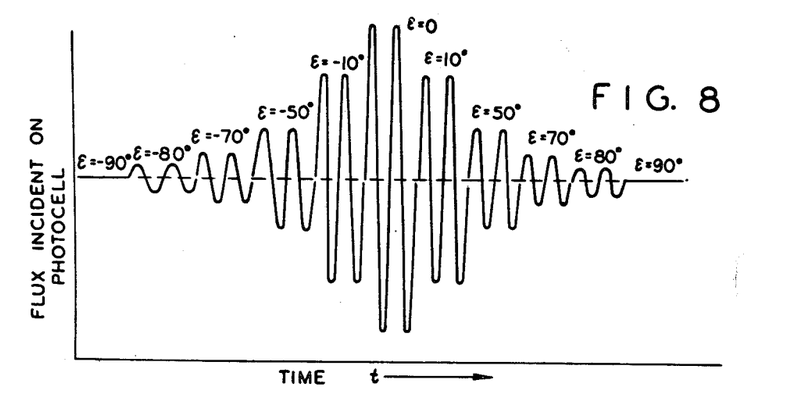
FIGURES 8, 9, and 10 are graphic charts showing the flux emerging from the rotating analyzer assemblies of the present invention and incident upon a photocell in different modifications to the invention and for different polarization states of the light incident upon these analyzer assemblies.
Figure 9:
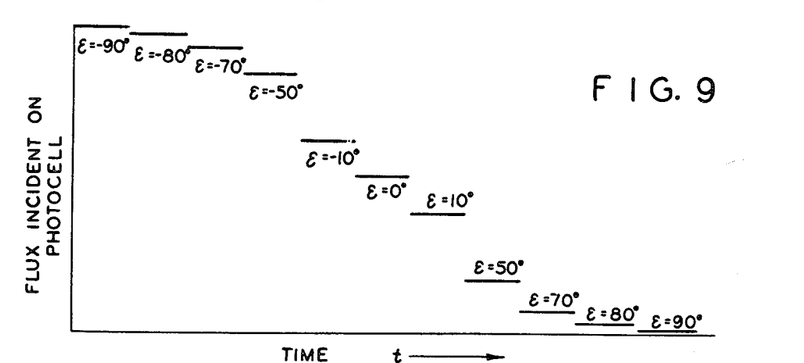
Figure 10:
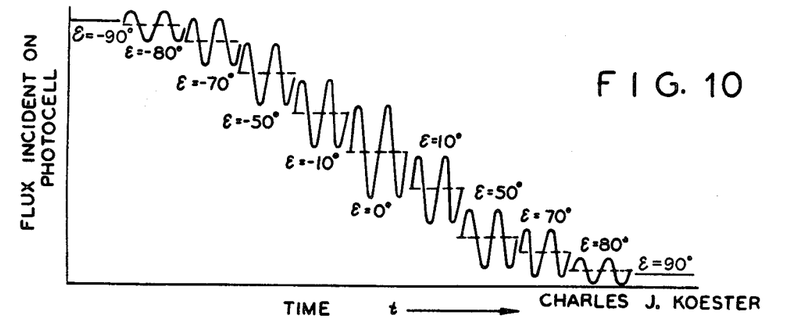

FIGURES 8, 9, and 10 show the light flux or light intensity emerging from various forms of rotating analyzers. For incident light having various amounts of ellipticity, FIGURE 8 shows emergent flux from a rotating linear analyzer or from a rotating analyzer assembly such as that shown in FIGURE 1 for light of a wavelength for which the element 26 provides a phase retardation of one wavelength or an integral number of wavelengths between perpendicularly plane polarized components. Emergent flux variations of this type are produced, for example, by the rotating linear analyzers described by Kent and Lawson, in their article, "A Photoelectric Method for the Determination of the Parameters of Elliptically Polarized Light," 27 J.O.S.A. 117 (March 1937), and by Hyde and Tubbs in their copending patent application, Serial No. 778,159, filed December 4, 1958, which issued as U.S. Patent No. 2,976,764 on March 28, 1961, and has been assigned to the assignee hereof.

The diagrams of FIGURES 9 and 10 show emergent flux variations produced by the rotating analyzer assemblies of the present invention, incorporating incident phase-retarding elements mounted for synchronized rotation with a linear analyzer.

Turning again to the diagram of FIGURE 8, when the incident light is left circularly polarized, $\epsilon=+90°$, the flux emerging from the rotating analyzer will be constant. For right circularly polarized incident light, $\epsilon=-90°$, the emerging flux will likewise be constant. For intermediate values of $\epsilon$, the emergent light will vary in intensity with the rotation of the analyzer assembly at a frequency of two cycles for each revolution of the analyzer assembly, with the fluctuation of maximum amplitude being produced by plane polarized light, $\epsilon=0$. For elliptically polarized light of varying ellipticities, the fluctuating emergent flux takes the form of sine waves of various intermediate amplitudes, depending upon the amount of the ellipticity, $\epsilon$.

The chart of FIGURE 8 thus shows the variations in emergent flux from the rotating analyzer assembly 20 of FIGURE 1 for varying amounts of ellipticity in incident monochromatic light having a wavelength such that retardation element 26 provides a relative phase retardation, $\phi$, of one wavelength or multiples of one wavelength between perpendicularly polarized components respectively parallel and normal to its fast axis FA, and for light of such a wavelength this form of rotating analyzer may be called a "linear" analyzer.

FIGURES 9 and 10 illustrate two families of curves of the emergent flux values observed with the rotating analyzer assembly of FIGURE 1 when retardation element 26 provides a phase retardation, $\phi$, in the neighborhood of 90°, or one-quarter wavelength, between the two normally plane polarized components of the incident light, and when the fast axis FA of element 26 is angularly offset at an angle $\gamma$ in the neighborhood of 45° measured from the polariaztion plane PP of the analyzer element 24. FIGURE 9 illustrates the special case when phase retardation $\phi$ equals 90° and $\gamma$ equals 45°; in this case the analyzer is thus provided with an incident quarter-wave plate oriented at 45°, eliminating the fluctuations of emergent light intensity caused by rotation of the analyzer assembly, but providing different intensity levels for differing ellipticity values in the incident light beam. FIGURE 10 illustrates the more general case, which may be called the "rotating elliptic analyzer" assembly, in which $\phi$ is in the neighborhood of but *not* equal to 90°, and/or in which $\gamma$ is in the neighborhood of but not equal to 45°. The selection of retardation $\phi$ and orientation angle $\gamma$ for the preferred elliptic analyzers of this invention are fully described hereinafter, where it will be explained that the elliptic analyzer with a single retardation plate 26 has its optimum usefulness for a particular light wavelength for which it is designed. From an examination of FIGURES 9 and 10, it will be evident that this form of the invention is particularly sensitive to circularly polarized light and is capable of distinguishing between left circularly polarized light and right circularly polarized light, since the flux passed by the rotating elliptic analyzer assembly and incident upon the photocell for $\epsilon=+90°$ and $\epsilon=-90°$ are at opposite extremes of the ranges of flux values shown in these two figures. The particular advantages of the rotating elliptic analyzers will be more fully described below with reference to FIGURES 9 and 10.

In the other embodiments of this invention illustrated in FIGURES 11 and 13, the phase-retarding element includes more than one phase-retarding plate combined with an analyzer in a rotating assembly. Such assemblies, incorporating a plurality of phase-retarding plates, have their optimum usefulness at a corresponding plurality of wavelengths of incident light, and they provide improved effectiveness over an extended range of light wavelengths. These embodiments of the invention may therefore be called "achromatic" elliptic analyzer assemblies, since they are useful for more than a single light wavelength.

In the rotating elliptic analyzer assembly shown in FIGURE 1, utilizing a single retardation element 26, the retardation plate 26 may be selected to be a quarter-wave plate for the particular light wavelength employed. If its principal axis FA is angularly displaced by the angle $$\gamma=45°$$

from the polarization plane PP of analyzer 24, the special case which might be called a "circular analyzer" is thus achieved. The output signal of the photocell will then vary with the ellipticity of the beam 22 and will be a maximum or minimum, respectively, for right or left circularly polarized light. This signal will not fluctuate, as can be seen from FIGURE 9. The circular analyzer is therefore well adapted for use with a direct reading D.C. meter indicator. FIGURE 9 also shows, however, that the signal for elliptically polarized light will closely approach the signal for circulary polarized light as the phase difference $\epsilon$ approaches 90°. For this reason the more general case of the "elliptic analyzer" in which plate 26 is not exactly a quarter-wave plate may be found to have greater general usefulness.

In the elliptic analyzer, retardation plate 26 is selected to provide relative phase retardation not equal to one-quater wavelength, between two component light beams respectively plane polarized parallel to its fast and slow axes. For example, plate 26 may produce a phase difference ranging between one-eight and three-eights of a wavelength for the particular wavelength of light employed, or between five-eighths and seven-eighths of a wavelength, or between nine-eighths and eleven-eighths, etc. The preferred ranges of values for the retardation $\phi$ provided by the plate 26 can therefore be stated:

$$\phi=A\lambda$$

Where $$\frac{4n-3}{8} \leq A \leq \frac{4n-1}{8} \quad (1)$$

and $n$ is any integer. Plate 26 is preferably joined to the front or incident face of analyzer 24 with its fast axis FA angularly displaced from the polarization plane PP of analyzer 24 by an angle $\gamma$ in the neighborhood of 45°, but not necessarily equal to 45°.

The photocell output signal produced by the rotating form of this elliptic analyzer embodiment varies with changes in the light flux incident on the photocell, and therefore exhibits the fluctuations shown in FIGURE 10. It will be noted that, for the different signals illustrated from left to right at the right-hand side of FIGURE 10, as the elliptically polarized light approaches left circularly polarized light having a 90° phase difference, the signal level falls and the amplitude of the fluctuations is reduced. The elliptic analyzer produces a constant signal for circularly-polarized light, but right-circularly ($\epsilon=-90°$) and left-circularly ($\epsilon=+90°$) polarized light produce constant signals of different values. This allows the observer to select the desired 90° phase difference and to distinguish the unwanted circular polariaztion condition created by phase adjustments in the optical system producing adjacent half-wavelength phase differences.

When the output signals produced by the rotating linear analyzer and the rotating eliptic analyzer corresponding to the incident flux values shown in FIGURES 8 and 10, respectively are compared for a nearly-circularly polarized beam 22, e.g. when $\epsilon=80°$, it will be seen that the ratio of fluctuations to average signal $$\frac{I_{max}-I_{min}}{I_{av}} \text{ or } \frac{\Delta I}{I_{av}} \quad (2)$$

is much greater for the elliptic analyzer (FIGURE 10) than for the linear analyzer (FIGURE 8). Since unavoidable noise produced in the detector system, including the optical system, the photocell, and the amplifiers and display devices represented by elements 130, 158, or 224 in FIGURES 5, 6, or 7 will generally increase as the average signal increases, it is evident that the signal-to-noise ratio of the elliptic analyzer (FIGURE 10) is significantly higher than that of the linear or circular analyzers (FIGURES 8 and 9). Thus, when beam 22 incident on the rotating analyzer assembly is being brought to a condition of circular polarization by adjustments of the light-modifying elements of the optical system, the desired settings for circular polarization can be observed with most precision with the elliptic analyzer embodiment of the invention.

Preferred values for the retardation $\phi$ and orientation angle $\gamma$ of plate 26 can be determined for various detector systems, and the optimum value of the retardation depends on both the type of detector to be used and the extinction factor of the polarizing system. For the calculation we assume a system consisting of source, polarizer, quarter-wave plate with its fast axis at an angle of $45°+x$ from the polarizer axis, and the elliptic analyzer consisting of a waveplate of retardation $\phi$ attached to an analyzer with an angle $\gamma$ between the fast axis of the waveplate and the analyzer axis. $x$ is generally a small angle so that $\sin x=x$, $\sin 2x=2x$, $\cos x=1$, and $\cos 2x=1$.

The quantity $x$ is a measure of the ellipticity of the elliptically polarized light. Therefore the analysis which follows applies to light of ellipticity specified by the quantity $x$, regardless of how this ellipticity was produced.

The flux transmitted by the analyzer is given by $$I_0=\tfrac{1}{2}-\tfrac{1}{2}\sin 2\gamma \sin \phi + x[1-\sin^2 2\gamma \sin^2 \phi]^{\tfrac{1}{2}} \cos(2\omega t-\alpha)$$

where $\omega$ is the angular velocity of rotation of the elliptic analyzer assembly, $t$ is the time and $\alpha$ is a constant which depends on the initial relative positions of polarizer and analyzer.

The above equation applies in the case of perfectly polarized light, i.e. no stray, unpolarized light. In any real system there will be a certain quantity of unpolarized light due to defects in the polarizer, dust, depolarization at lens surfaces, etc. We assume that the magnitude of the unpolarized light is 2A, that of the polarized component is B. The transmitted flux is then given by $$I = A + B\{½ - ½ \sin 2\gamma \sin \phi + [1 - \sin^2 2\gamma \sin^2 \phi]^{½} \cos(2\omega t - \alpha)\}$$
$$= A + B\{½ - ½Z + x(1-Z^2)^{½} \cos(2\omega t - \alpha)\}$$

where Z has been substituted for $\sin 2\gamma \sin \phi$.

As $t$ varies the maximum and minimum values of I are:

$$I_{max} = A + B[½ - ½Z + x(1-Z^2)^{½}]$$
$$I_{min} = A + B[½ - ½Z - x(1-Z^2)^{½}]$$

Therefore $\Delta I = I_{max} - I_{min} = 2Bx(1-Z^2)^{½}$

For a detector whose sensitivity depends only on the magnitude of the fluctuation (e.g. a photoelectric device with noise independent of the light flux), we wish to maximize $\Delta I$ with respect to Z. The symbol $Z_0$ can represent the optimum value of Z, and $$\frac{d\Delta I}{dZ} = 0 = -2Bx(1-Z_0^2)^{-½}Z_0$$

The solution is $Z_0 = \sin 2\gamma_2 \sin \phi_0 = 0$. This equation in turn has two solutions, one of which is $\phi_0 = 0$ or $\nu\pi$ where $\nu$ = integer. This implies either no waveplate, or a half-, full-, etc waveplate. The other solution is $\gamma_0 = 0$ or $$\nu \frac{\pi}{2}$$

where $\nu$ = integer. This implies that either the fast or slow axis of the waveplate is parallel to the analyzer axis. In both solutions, then, the combination acts as a linear analyzer.

Thus for this type of detection system a linear analyzer is optimum, no matter what the extinction factor of the system.

Next assume that the sensitivity is limited by the statistical fluctuations in the light beam and the shot noise of the photomultiplier. The magnitude of this noise is given by $N = K\sqrt{I_{av}}$, where K is a constant. In order to obtain the maximum signal-to-noise ratio, we maximize the quantity $$\frac{\Delta I}{N} = \frac{1}{K} \frac{\Delta I}{\sqrt{I_{av}}}$$

For $I_{av}$ we take the value for circularly polarized light:

$$I_{av} = A + B[½ - ½Z]$$

For the optimum value of Z we obtain $$Z_0 = \sin 2\gamma_0 \sin \phi_0 = \frac{2}{B}(A - \sqrt{A(A+B)}) + 1 = \frac{\sqrt{E}-1}{\sqrt{E'}+1}$$

Here $$E = \frac{A+B}{A}$$

is the extinction factor of the system. The extinction factor is a useful quantity because it is easily measured. If the polarized component, B, is linearly polarized, the extinction factor is simply the ratio of maximum to minimum flux transmitted by the linear analyzer as the latter is turned. If the polarized component, B, is elliptically polarized, it is necessary first to convert to plane polarized light by means of a phase compensator such as the Babinet-Soliel compensator 58 in FIGURE 3. Then as a linear analyzer is turned, the ratio of maximum to minimum transmitted flux is equal to the extinction factor, E.

For example, if $E = 35$, as in the AO Baker 100 power shearing interference microscope, and if we set $$\sin 2\gamma_0 = 1 (\gamma_0 = 45°)$$

then $$\sin \phi_0 = \frac{\sqrt{35}-1}{\sqrt{35'}+1} = .710$$

$$\phi_0 = 45.2°$$

Finally, assume that the sensitivity of the detection system is proportional to $\Delta I / I_{av}$. Maximizing this quantity with respect to Z yields $$Z_0 = \sin 2\gamma_0 \sin \phi_0 = \frac{B}{2A+B} = \frac{E-1}{E+1}$$

For $E = 35$, $\sin 2\gamma_0 = 1$, we have $\sin \phi_0 = .945$ and $\phi_0 = 71°$.

Thus we have assumed that $\gamma = 45°$ and have found the optimum values of $\phi$. We could also take an arbitrary value of $\phi$ and calculate by the above equations the optimum value of $\gamma$. The only restriction would be that $$\sin \phi \geq \frac{E-1}{E+1}$$

It has thus been shown that there is an optimum value $\phi_0$ for the effective retardation $\phi$ of the elliptic analyzer. This value depends on the extinction factor of the polarizing system being used.

In the above derivation, it has been assumed that monocromatic light is used. If a waveplate is selected for the elliptic analyzer so that its retardation is optimum for one wavelength, it will not in general be optimum for other wavelengths.

However, in the elliptic analyzer of FIGURE 1, it is possible to select a retardation plate 26 which will be a quarter-wave plate and thus act as a circular analyzer, for a wavelength $\lambda_0$ near the center of the visible spectrum, while providing the advantages of the elliptic analyzer for other wavelengths above and below $\lambda_0$.

Different embodiments of the invention, useful with incident light of a plurality of wavelengths and therefore called "achromatic" elliptic analyzer assemblies, are described hereinafter.

Various optical systems employing polarized light and incorporating the rotating analyzer assemblies of the present invention are shown in FIGURES 3, 4, 5, 6, and 7.

Figure 3:
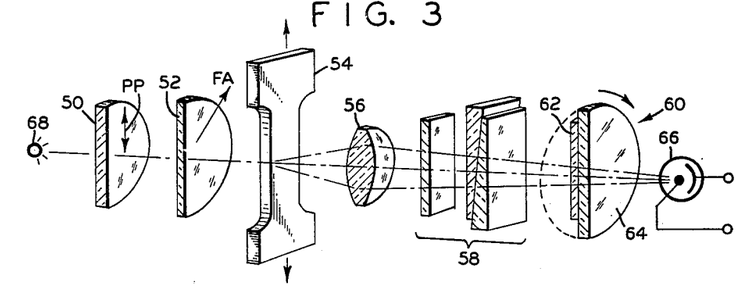
FIGURE 3 is a perspective schematic diagram of a polarized light optical system employed in photoelasticity work and incorporating an embodiment of the present invention.

The optical system shown in FIGURE 3 is useful in photo-elasticity studies of stresses, stress concentrations and stress-birefringence of materials. This system includes a polarizer 50 having its polarization plane PP vertical, a quarter-wave plate 52 having its fast axis offset by 45° from polarization plane PP, a specimen 54 generally of substantially transparent plastic material formed in the shape of the physical element to be studied, a condenser lens 56 focusing light emerging from a portion of the specimen 54 upon a photocell 66, a calibrated phase-adjusting means, shown as a modified Babinet-Soliel compensator 58, and a rotating analyzer assembly generally indicated at 60 including a phase-retarding element 62 secured to the incident face of an analyzer 64 and thus mounted for simultaneous and continuous rotation. Light from a source 68 passes through polarizer 50 to be plane polarized in a vertical plane. The quarter-wave plate 52 converts this light to circularly-polarized light as described above. The transparent specimen 54, although it is ordinarily an isotropic material, becomes anisotropic when placed under load, with the amount of birefringence being dependent upon the internal stress and resulting strain at a particular point. This birefringence produces a phase retardation between the normal components of the incident circularly-polarized light, and the amount of this phase difference varies directly with the stress values at various points throughout the specimen. The calibrated phase-adjusting element 58 is employed to cancel this phase retardation effect produced by the internal stress in specimen 54 for any particular preselected point in the specimen for which light is focused by the lens 56 upon the photocell 66. The phase-adjusting element 58 is preferably calibrated to indicate the amount of phase correction required to restore the light emerging therefrom to a state of circular polarization, and the rotating analyzer assembly 60 indicates the precise adjustment of the element 58 producing the desired correction by producing a nonfluctuating signal from photocell 66 when the desired state of circular polarization is obtained, as mentioned previously with reference to FIGURES 8, 9, and 10. The effectiveness of the photoelasticity system shown in FIGURE 3 may be demonstrated by comparing it with a standard photoelasticity polariscope arrangement including a light source, a polarizer, a a specimen, an analyzer, and a photocell, with a chopper disk interposed to interrupt the light reaching the analyzer periodically. When the opaque blade of this chopper is in its interrupting position, the flux reaching the photocell is zero. When the blade is not in its interrupting position, the flux reaching the photocell is $$I \sin^2 \frac{D}{2}$$

where I is the flux which would reach the photocell if the polarizer and analyzer are parallel with no specimen present, and D is the retardation of the specimen. Therefore, the amplitude of the fluctuation is $$I \sin^2 \frac{D}{2} \approx I \frac{D^2}{4}$$

If the rotating elliptic analyzer is used with the system of FIGURE 3 and the effective retardation of the waveplate is also made equal to D, then the flux transmitted by the analyzer varies sinusoidally. The minimum is zero and the maximum is $I \sin^2 D \approx ID^2$. Thus the signal produced by the rotating elliptic analyzer is four times as great as that produced by the "standard" polariscope chopper system.

The rotating elliptic analyzer produces this maximum signal regardless of the orientation of the specimen 54 with respect to the polarization plane of polarizer 50. With the standard polariscope chopper system, the maximum signal is obtained only when the axis of the specimen is oriented at 45° to the polarization plane of the polarizer. Furthermore, the rotating elliptic analyzer can be used to determine the orientation of the optical axis of the specimen by employing a phase sensing device such as a generator driven in synchronism with rotating elliptic analyzer 60. Such a generator, cooperating with suitable instrumentation, may be calibrated to indicate the instantaneous angular orientation of the analyzer 60 which produces a maximum output signal from photocell 66. Thus the direction as well as the magnitude of the stress in the loaded specimen 54 can be determined photoelectrically by the polarized light systems employing the rotating analyzers of the present invention. With suitable adaptations, the system of FIGURE 3 may be employed with many other photoelasticity arrangements, including those employing a thin plastic coating applied and bonded directly to the three-dimensional structure to be loaded, with the polarized light being directed into the coating and reflected back from its bonded surface, to be analyzed by means of the elements 56, 58, 60, and 66 shown in FIGURE 3, whereby actual surface strains in the structure itself may be measured and analyzed. With these arrangements, the coating replaces the specimen 54 of FIGURE 3, and the light passes through it twice before being analyzed.

Figure 4:
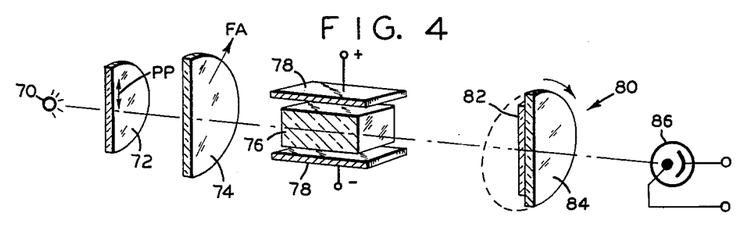
FIGURE 4 is a perspective schematic diagram of a polarized light optical system employed in the study and measurement of double refraction phenomena induced in a specimen by the presence of an electric field, known as the Kerr electro-optical effect, and incorporating an embodiment of the present invention.

FIGURE 4 is a schematic diagram of a polarized light optical system useful in the study of birefringence induced by the presence of an electrical potential creating an electrostatic field across the specimen 76, known as the Kerr electro-optic effect. The electro-optic effect is particularly useful in the construction of high speed shutters for cameras and other optical systems. Fast shutter speeds and very rapid consecutive exposures are made possible by the changes in the optical properties of the shutter elements. These may be induced by electrical fields varying at any desired rate or interval.

The system of FIGURE 4 includes a light source 70, a polarizer 72 having its polarization plane PP oriented vertically, a quarter-wave plate 74 with its fast axis FA offset by 45° from polarization plane PP, a normally isotropic specimen 76 which may be a block of crystalline material positioned between two electrodes 78 across which an electrical potential may be applied, a rotating elliptic analyzer assembly 80 including a retardation plate 82 and an analyzer 84 mounted for simultaneous and continuous rotation, and a photocell 86. Such liquids as nitrobenzene exhibit the Kerr electro-optic effect to a marked degree, and the specimen 76 may therefore be a "Kerr cell" containing such a liquid as nitrobenzene.

The optical system of FIGURE 4 is useful in detecting and measuring electric fields, and also in the determination of the Kerr constant for various materials. The Kerr effect results from the alignment of the molecules with the electric field, and in certain plastics the large molecules take from a few microseconds to several seconds to align themselves with the electric field. The time depends on whether the electric dipole moment of the molecule is induced or inherent, on the size of the molecule, and on the viscosity of the fluid. The present system can therefore be used to measure the size of molecules when the other quantities are known.

In the system shown in FIGURE 4, plane-polarized light emerging from the polarizer 72 is converted to circularly-polarized light by quarter-wave plate 74. When the speciment 76 is isotropic, exhibiting no birefringent or double refraction properties, the circular polarization of this light is undisturbed as it passes through the specimen. The rotating elliptic analyzer 80 therefore exhibits a constant unfluctuating light intensity transmitted to the photocell 86, as mentioned previously with reference to FIGURE 10. When an electrical potential is applied to the electrodes 78 and the specimen becomes anisotropic and therefore birefringent, the phase retardation introduced by the specimen changes the circularly-polarized light incident upon the specimen into elliptically-polarized light, causing a fluctuating output signal from photocell 86, as shown in FIGURE 10. If the amount of phase retardation D introduced by the specimen is to be measured, a phase compensator similar to element 58 in FIGURE 3, for example, may be interposed in like manner between quarter-wave plate 74 and the rotating analyzer assembly 80. When such a compensator is adjusted to cancel the phase retardation D introduced by the specimen 76, the light reaching the rotating analyzer assembly 80 will again be circularly polarized, and the photocell signal will thus again be constant.

The effectiveness of the optical system shown in FIGURE 4 may be demonstrated by comparing it with a standard crossed polariscope system including only a source, a vertical polarizer, a Kerr cell flanked by electrodes, a horizontal analyzer, and a photocell. With this system, if the phase retardation introduced by the specimen is D when the voltage is applied to the electrodes 78, the light flux reaching the photocell is $$I \sin^2 \frac{D}{2} \approx I \frac{D^2}{4}$$

and the light flux is zero when this voltage is removed. With the system of FIGURE 4, on the other hand, if the retardation plate 82 is made to have an effective retardation, $\phi$, equal to D, then the flux varies between zero and $I \sin^2 D \approx ID^2$. Thus for any given light level, the elliptic rotating analyzer system of FIGURE 4 can be made four times as sensitive as the standard crossed polariscope system. As with the photoelasticity system shown in FIGURE 3, the elliptic rotating analyzer 80 also has the advantage of producing a full-amplitude signal regardless of the orientation of the optic axis of the specimen 76. In this case this axis is controlled by the direction of the electric field. The direction of this axis can be determined from the phase of the signal. If a suitable phase-sensing device, such as a generator, is associated with the rotating analyzer assembly 80, the angular orientation corresponding to the maximum analyzer output signal may be indicated. Thus the direction as well as the strength of the electric field can be determined.

Figure 5:
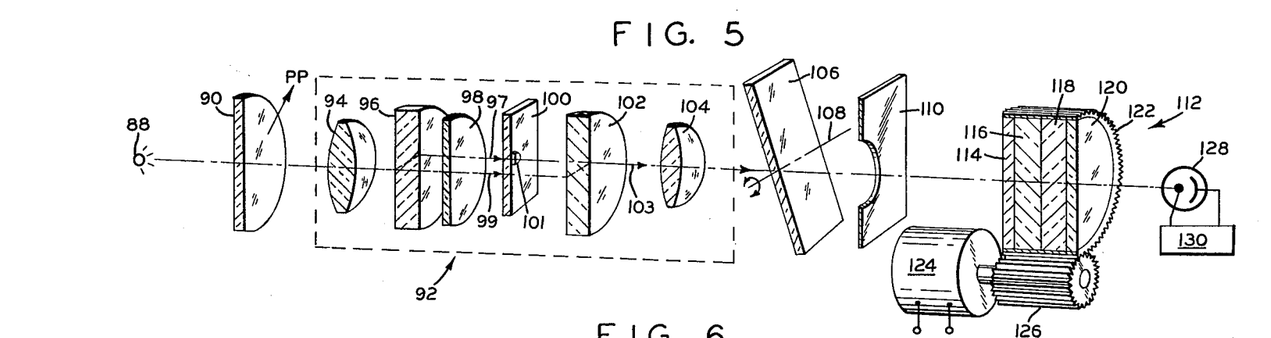
FIGURE 5 is a perspective schematic diagram of an interference microscope employed in the observation and measurement of optical properties of microscopic specimens by means of interference phenomena and employing an embodiment of the present invention.

FIGURE 5 is a schematic diagram of a shearing type of interference microscope, such as the AO-Baker interference microscope, in which the rotating analyzer assemblies of the present invention can be employed in observing and determining the optical characteristics of a specimen. This system includes a light source 88, a polarizer 90, and the microscope light-modifying elements enclosed in the box generally indicated at 92. These include a condenser lens 94, a beam-dividing element 96, a 90° rotator element 98, a specimen-supporting member 100 on which a specimen 101 is positioned, a beam-recombining element 102 and an objective lens 104. The beam-dividing element 96 generally comprises a plate of birefringent material so oriented that it divides the incident plane polarized beam from polarizer 90 into two perpendicularly polarized component beams 97 and 99 which then have their respective planes of polarization rotated through 90° by the rotator element 98. Specimen 101 is positioned in the path of one of these beams, i.e. beam 97 in FIGURE 5, while the other beam 99 passes through the surround outside the specimen 101. The two beams are recombined by element 102 into a single resultant beam 103, the recombining element 102 generally being a second plate of birefringent material substantially identical to beam-dividing element 96. Because the polarization plane PP of polarizer 90 is oriented at 45° to the optic axis azimuth of plate 96, the amplitudes of the two component beams 97 and 99 are equal. Phase retardation and absorption of beam 97 by the specimen 101 may reduce the amplitude and change the phase of specimen beam 97, making the combined resultant beam 103 elliptically polarized. Resultant beam 103 may be brought to a state of circular polarization by making two adjustments. First, a rotary adjustment of polarizer 90 is made to change the orientation of its polarization plane PP. This varies the relative amplitudes of the two component beams 97 and 99. Second, a tilting adjustment of the phase-compensator element 106 is made. This element is preferably a plate of birefringent material mounted for tiltable adjustment about a transverse axis 108. This latter adjustment varies the relative phase of the two component beams. The desired state of circular polarization of the resultant beam 103 may be observed and identified by the continuously-rotating analyzer assembly 112, including three phase-retardation plates 114, 116, and 118, and an analyzer element 120, all mounted for continuous rotation within a gear wheel 122 driven by a motor 124 through a pinion 126. The light emerging from the rotating analyzer assembly 112 is directed at photocell 128, producing an output signal therefrom which may be amplified and displayed by the use of meters, oscilloscopes, recording oscillographs, or the like; such amplification and display devices being represented by the block 130 in FIGURE 5.

In the interference microscope optical system shown in FIGURE 5, rotating analyzer 112 is an achromatic analyzer assembly, hereinafter described in detail. This interference microscope system is provided with a rotatably-adjustable polarizer 90 and a tiltably-adjustably phase-compensating device 106; it may thus be used to measure the phase retardation and absorption characteristics of the specimen 101 by employing a plurality of wavelengths of incident light for which the achromatic rotating analyzer assembly 112 is designed. The availability of two or more wavelengths of incident light is an important advantage in determining the order of interference when more than one wavelength of phase retardation is provided by the specimen 101. Also, in the field of microspectrophotometry, the optical characteristics of the specimen 101 may be studied and measured for a variety of wavelengths of incident light, since the achromatic rotating analyzer assembly 112 is not limited to any particular wavelength.

Figure 6:
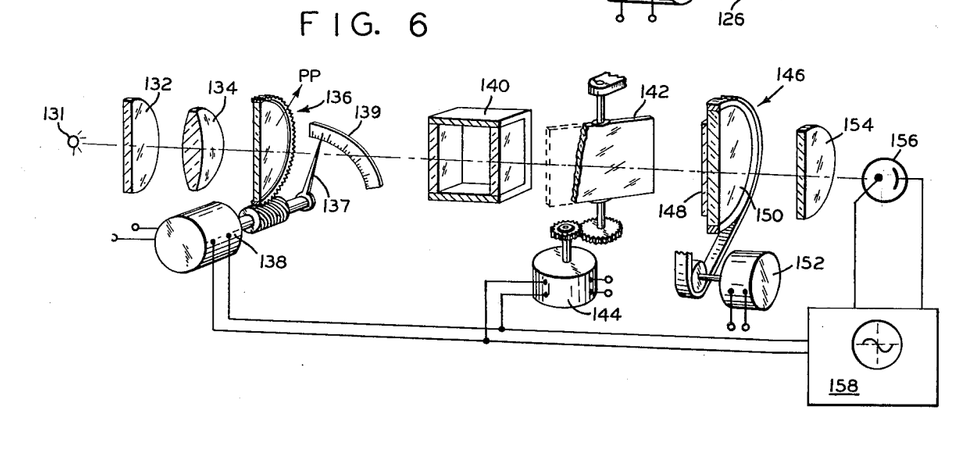
FIGURE 6 is a perspective schematic diagram of a polarimeter system incorporating an embodiment of the present invention and useful in measuring with high precision the optical rotation effects produced upon polarized light by a specimen, such as a sugar solution.

A polarimeter optical system capable of automatic and extremely precise indications of polarization plane rotation induced by a specimen is shown schematically in FIGURE 6. Such rotation effects are exhibited by many materials, and are particularly useful in determining the concentration of sugar solutions in saccharimetry, for example. In FIGURE 6, light from a source 131 passes through a monochromator 132, which may be a suitable filter, through a focusing lens 134, through a rotatably adjustable calibrated polarizer generally indicated at 136 driven by a phase-sensitive servomotor 138. Motor 138 is designed to turn clockwise or counterclockwise when the signal has a phase of 0° or 180° respectively, the speed increasing with the magnitude of the signal, and the motor stopping when the signal is zero. The motor does not respond to a signal with phase 90° or 270°. When the phrase "servomotor" is used herein it is intended to mean a motor generally similar to motor 138.

The adjusted position of polarizer 136 is indicated by a pointer 137 on a scale 139. Plane polarized light emerging from the polarizer 136 passes through a cell 140 in which a liquid sample is contained, and thence through a tiltably-adjustable quarter-wave plate 142, driven by a second servomotor 144, through a rotating elliptic analyzer generally indicated at 146 including a phase retardation plate 148 and an analyzer element 150 driven by a continuously running synchronous motor 152. Light emerging from the analyzer assembly 146 passes through a depolarizer 154, which may be a sheet of wax paper or the like to a photocell 156 whose output signal is amplified and displayed on suitable instrumentation generally indicated at 158. This instrumentation may include meters, oscilloscopes, oscillographs, and the like. The amplified output signal is also relayed to the phase-sensitive motors 138 and 144.

As described above, the rotating elliptic analyzer 146 will produce what may be called error signals from photocell 156 if the light incident upon the analyzer assembly departs from circularly-polarized light. If the normal fast and slow principal axes of the quarter-wave plate 142 are positioned vertical and horizontal respectively, and if the polarization plane PP of the polarizer 136 is adjusted to a 45° position between the vertical and horizontal planes, and if the specimen in the cell 140 exhibits no optical rotation of this plane of polarization, the light incident upon the rotating analyzer assembly 146 will be circularly-polarized and no error signal will be produced. If the quarter-wave plate 142 does not provide exactly 90° phase retardation for the particular wavelength of light passed by the monochromator 132, the resulting ellipticity in the light incident upon analyzer assembly 146 will be a departure from circular polarization toward an ellipse. Such ellipse has its principal axes aligned parallel and normal to the polarization plane PP of the polarizer 136, which is set at 45° from the vertical. This produces an error signal from photocell 156, which will be transmitted to the phase-sensitive servomotor 144. In response to this error signal, the motor 144 rotates the quarter-wave plate 142 about one of its principal axes to change the phase retardation it provides until this ellipticity is removed and the error signal producing rotation of plate 142 is reduced to zero. This system is thus designed for automatic adjustment of plate 142 to provide exactly 90° phase retardation for various wavelengths passed by monochromator 132, and a plurality of different monochromators may therefore be used to obtain readings at different light wavelengths.

Rotation of the plane of polarization introduced by the liquid sample in cell 140 will likewise produce ellipticity in the light incident upon rotating analyzer assembly 146, but this ellipticity will be a departure from circular polarization in a direction parallel either to the vertical or horizontal principal axis of the quarter-wave plate 142. Since the rotating analyzer assembly 146 produces two cycles of intensity fluctuation in the light emerging therefrom for each revolution thereof, it will be apparent that the error signals produced by photocell 156 in response to the separate ellipticities described above will be "orthogonal," or 90° apart in phase. The two phase-sensitive servomotors 138 and 144 may therefore be made separately responsive to each of these two orthogonal error signals, and motor 138 will thus respond only to the error signal produced by rotation of the specimen in cell 140, thereby rotatably adjusting polarizer 136 to cancel this rotation of the plane of polarization. When polarizer 136 has thus been adjusted to match and cancel the rotation introduced by the specimen in cell 140, the light incident upon the continuously-rotating elliptic analyzer 146 will be circularly polarized, and no error signals will be produced by the photocell 156. Phase-sensitive servomotors 138 and 144 thus produce the desired state of circular polarization automatically, and the amount of rotation introduced by the specimen in cell 140 may be read directly from scale 139. The motors 138 and 144 are connected to the A.C. source driving synchronous motor 152 for phase-comparison purposes, and the analyzer assembly 146 may be adjustably and drivingly connected to motor 152 by gears, a "timing" belt drive employing a toothed belt, or other suitable means to select and maintain the desired phase relationship. For greater precision in null-sensing, a phase-indicating generator such as element 226 in FIGURE 7 may be employed as described hereinafter. The important advantage of the rotating elliptic analyzer assembly 146 in significantly increasing the signal-to-noise ratio and substantially enhancing the sensitivity and precision of the system shown in FIGURE 6, as compared with such a system employing only a rotating linear analyzer, has already been pointed out.

Figure 7:
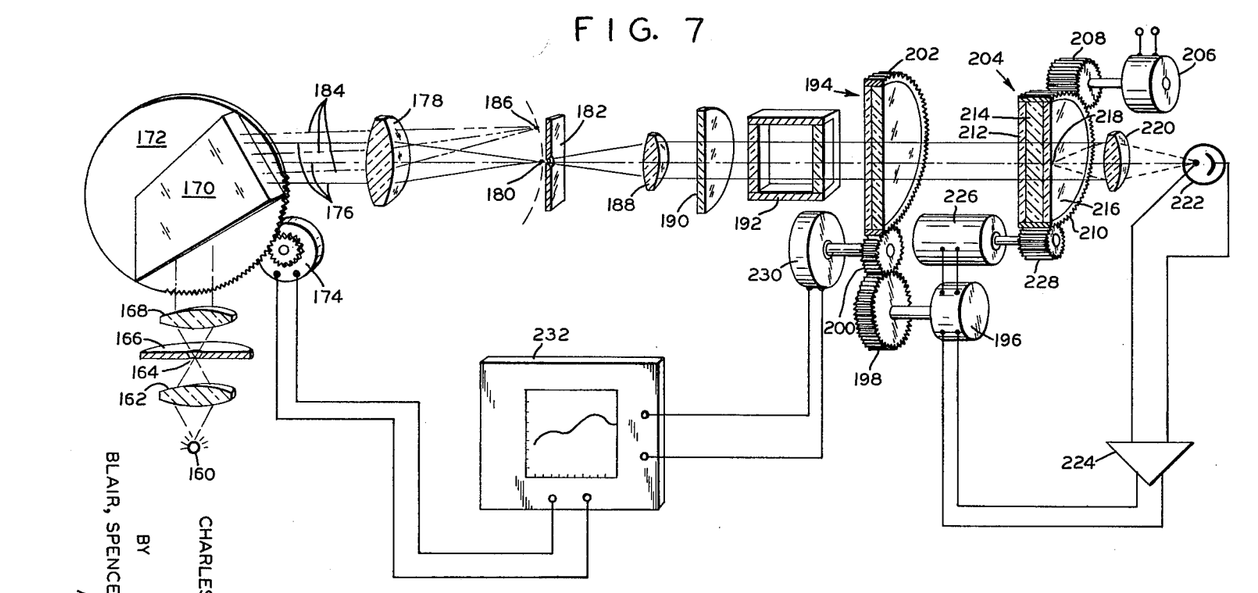
FIGURE 7 is a perspective schematic diagram of an automatic recording spectropolarimeter incorporating an embodiment of the present invention and adapted for recording the amount of rotation of the plane of polarization produced by a specimen upon incident polarized light of different wavelengths.

An automatic recording polarimeter is shown in the schematic diagram of FIGURE 7, where polychromatic light from a source 160 is focused by a condenser lens 162 upon a small aperture or narrow slit 164 in an iris diaphragm 166. Light passing through the aperture 164 is collimated by a collimator lens 168 and directed to a Pellin-Broca prism 170 mounted upon a rotatably-adjustable table 172 driven by a motor 174. Light of different wave-lengths emerges from prism 170 along parallel beams traveling in chromatically-dispersed directions. Thus, for example, green light leaving prism 170 will travel along the rays 176 parallel to the optic axis of the system and will therefore be focused by a collimater lens 178 at an aperture 180 in a slit diaphragm 182. Red light leaving prism 170 will travel along parallel, rays 184, which are angularly dispersed from the rays 176 impinging upon collimator lens 178 at different angles of incidence from the rays 176, and thus being focused by the lens 178 at point 186 laterally removed along the resulting spectrum from the aperture 180. The rotation of the table 172 and the prism 170 mounted thereon by the driving motor 174 thus changes the wavelength of light focused by the lens 178 at the aperture 180 and permits light of a succession of wavelengths to be supplied to the remainder of the optical system of FIGURE 7.

Light passing through aperture 180 is collimated by lens 188 and passes through polarizer 190, through a cell 192 containing a sample of the specimen liquid to be examined, through an achromatic quarter-wave retardation assembly 194 which may be rotatably adjusted by a phase-sensitive servomotor 196 by way of a pinion 198 and an idler gear 200 meshing with a gear wheel 202 encircling the achromatic quarter-wave retardation assembly 194. Light emerging from the element 194 passes through a rotating elliptic analyzer assembly 204. The continuously-rotating elliptic analyzer assembly 204 is driven by a motor 206 by way of a pinion 208 meshing with a gear wheel 210 encircling the optical elements of the analyzer assembly; these include phase retardation plates 212 and 214 and an analyzer 216, all of which are mounted for integral rotation within gear wheel 210. Light emerging from the rotating elliptic analyzer assembly 204 at a point 218 on the emergent face of the analyzer 216 is focused by an objective lens 220 upon a photocell 222, producing an output signal which is amplified by the amplifier 224 and directed therefrom to phase-sensitive servomotor 196. This servomotor is also supplied with a phasing signal derived from a generator 226 rotated in synchronism with the analyzer assembly 204 by way of a pinion 228 meshing with the gear wheel 210. Operation of the motor 196 to vary the angular orientation of the achromatic quarter-wave retardation assembly 194 also turns idler gear 200 driving a variable potentiometer 230. An X-Y recorder 232 is connected to the motor 174 and the potentiometer 230 in such fashion that rotation of motor 174 governs the position of the recording pen along the horizontal X-axis of the recorder 232. Inasmuch as motor 174 drives table 172 and prism 170 which changes the wavelength of light passing through aperture 180, this X-axis of the recorder may be calibrated to depict such operation. The orientation of the achromatic quarter-wave retardation element 194 is sensed by the potentiometer 230, and signals therefrom are fed to the recorder to govern the vertical, Y-axis orientation of the recording pen therein.

The achromatic quarter-wave retardation assembly 194 may be, for example, the achromatic quarter-wave plate described by Pancharatnam in Proceedings of the Indian Academy of Sciences, Volume 41, page 137 (1955), or the achromatic circular polarizer described in the French article entitled Design of a Quasi-Achromatic Quarter Wave Plate Using Two Plates of the Same Crystalline Material by G. G. Destriau and J. Prouteau and published in Journal of Physique Radium, Serial 8, Volume 10, pages 53–55, February 1949. Thus assembly 194 will produce circularly-polarized light to be transmitted to the rotating analyzer assembly 204 only when the light incident on assembly 194 is plane polarized at a particular preselected angle with respect to the principal axis of its separate optical elements. Rotational adjustment of assembly 194 by way of motor 196 will therefore produce circularly-polarized light emerging therefrom for any particular adjusted position thereof. Any departure from circular polarization in the light passing from element 194 to rotating analyzer assembly 204 will produce an error signal from photocell 222 in the manner described above with reference to the system of FIGURE 6. This error signal is amplified by amplifier 224 and fed to to phase-sensitive servomotor 196; this adjusts assembly 194 until circular polarization is attained. The adjusted positions of assembly 194 may be calibrated in terms of the azimuth of the incident polarization plane. Various corresponding resistance values of the variable potentiometer 230 may be calibrated to correspond to particular amounts of rotation of the plane of polarization of incident light produced by a sample contained in the cell 192. Such values may then be recorded in recorder 232.

Thus the system of FIGURE 7 is an automatic recording spectropolarimeter in which the polarization plane rotation produced by the specimen is plotted along the Y-axis or recorder 232, while the wavelength of the incident light is plotted along the X-axis of the recorder. When property calibrated, this system measures the rotation for each wavelength automatically and plots these rotation figures on a graph similar to that shown schematically on recorder 232 in FIGURE 7.

If the elliptic analyzer assembly consists of a single waveplate 26 attached to the analyzer 24 (FIGURE 1), then it can provide optimum retardation for only one wavelength. At other wavelengths the optimum retardation condition is not satisfied, and also the phase and/or amplitude relations of the rotating analyzer are upset. In other words, the orthogonality of the error signals employed in the system of FIGURE 6 would not hold for all wavelengths.

White light or monochromatic light of many different wavelengths can be used, however, if the elliptic analyzer assembly is made achromatic. Using two waveplates 32 and 34 in series attached to the analyzer 30, as shown in FIGURE 11, an optimum elliptic analyzer at two wavelengths with good performance at nearby wavelengths can be obtained. If three wave plates in series are secured to the analyzer, as in FIGURE 13, the rotating elliptic analyzer assembly provides optimum performance at three wavelengths and gives very good performance at nearby wavelengths.

There are many different combinations of two wave plates which can produce or analyze the same state of ellipitically polarized light at two wavelengths. As an example, we may consider, the combination shown in FIGURE 11, in which the wave plate materials are identical and the second retardation plate 34 is twice as thick as the first plate 32, plate 34 being a half-wave plate at a central wavelength $\lambda_0$, and plate 32 being a quarter-wave plate at $\lambda_0$. Then the half-wave plate 34 can be made by cementing together two quarter-wave plates, and all three pieces can be cut out of one sheet of quarter-wave plate material.

Figure 12:
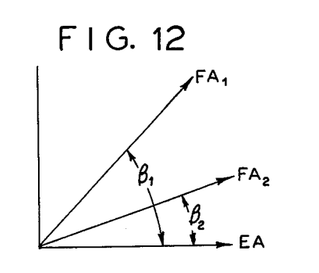
FIGURE 12 is a diagram further illustrating the orientation of the elements of the embodiment of the invention shown in FIGURE 11.

The orientations of the principal axes of the phase-retarding elements 32 and 34 are shown in FIGURE 12, where the angles $\beta_1$ and $\beta_2$ are measured from the extinction axis EA of the linear analyzer 30 to the fast axis of each plate, $FA_1$ and $FA_2$, respectively.

The equations for $\beta_1$ and $\beta_2$ are $$\tan \beta_2 = 2 \frac{\sin J}{\sin \phi} \pm \sqrt{4 \frac{\sin^2 J}{\sin^2 \phi} - 1}$$

$$\tan (\beta_1 - \beta_2) = 2 \sin J \tan \frac{\phi}{2} - \tan \beta_2$$

where $J$ is the retardation of the quarter-wave plate 32 at either wavelength $\lambda_1$ or $\lambda_2$, these being the wavelengths for which the system is to be achromatized, and $\phi$ is the desired total effective retardation. The optimum value of $\phi$ is selected according to the extinction factor of the system, as described above.

Figure 15:
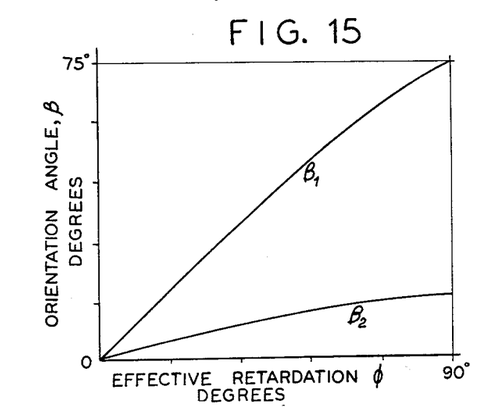
FIGURE 15 is a graph showing different relative orientations of the elements of the embodiment of the invention shown in FIGURE 11.

FIGURE 15 is a plot of $\beta_1$ and $\beta_2$ as functions of the desired effective retardation $\phi$. The values of $\beta_1$ and $\beta_2$ shown in FIGURE 15 were calculated for the case in which the achromatic wavelengths are at approximately 4500 A. and 6000 A., assuming no dispersion of birefringence.

If three wave plates in series are mounted preceding the analyzer element for continuous rotation therewith, as shown in FIGURE 13, the combination can produce or analyze a particular state of elliptically-polarized light for three different wavelengths of incident light. One example of such a system, shown in FIGURE 13, employs two "second" retardation plates 236 and 238 which are half-wave plates at a particular wavelength $\lambda_0$ near the center of the spectral region of interest, plus another "first" retardation plate 240 which is a quarter-wave plate at $\lambda_0$. Plates 236, 238, and 240 are all preferably made from identical material. The orientation angles of these retardation plates measured from the extinction axis EA of the analyzer 242 to the fast axis of each plate are as follows:

$\beta_1 = 67.5°$ (for plate 240)
$\beta_2 = 29.5°$ (for plate 236)
$\beta_2 = 7.0°$ (for plate 238)

At three wavelengths $\lambda_0$, $\lambda_1$, and $\lambda_2$, the state of elliptically-polarized light which will be extinguished has the following parameters: The major axis of the ellipse is parallel to the axis of plate 240, the ratio of minor to major axis is $b/a = \tan \frac{1}{2}(45°) = .414$, and the polarization vector is rotating counterclockwise. The retardation of the first plate 240 at each of these wavelengths is:

$D(\lambda_0) = 90°$
$D(\lambda_1) = 70°$
$D(\lambda_2) = 110°$

If the central wavelngth, $\lambda_0$, is selected to be 546 m$\mu$, then the other two wavelengths at which achromatization occurs are $\lambda_1 = 702$ m$\mu$ and $\lambda_2 = 447$ m$\mu$, assuming that the wave-plate material has zero dispersion of birefringence As with the two-retardation element system of FIGURE 11, the three-element elliptic analyzer of FIGURE 13 can be constructed from pieces all cut from the same sheet of quarterwave material. In the three-element case, five pieces are needed, two each for the two half-wave plates 236 and 238 plus one quarter-wave plate for the element 240.

Each of these achromatic analyzer assemblies combines with a linear analyzer an achromatic phase-retarding component capable of converting a particular state of elliptically polarized light to plane polarized light at each of a plurality of wavelengths. Correspondingly, if plane polarized light is incident upon this achromatic phase-retarding component in the reverse direction, it will be converted to the same particular state of elliptically polarized light at each of a plurality of wavelengths.

Figure 14:
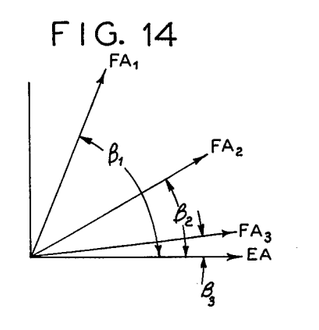
FIGURE 14 is a vector diagram further illustrating the orientation of the elements of the embodiment of the invention shown in FIGURE 13.

Each of these achromatic phase-retarding components includes a plurality of phase-retarding elements interposed serially in the beam of polarized light to be converted from one such polarization state to the other, as described above. In general, the fast axes of these separate elements are angularly offset by angles not equal to 90°, as shown by the $\beta$ angles described above and shown in FIGURES 12 and 14.

The rotating achromatic elliptic analyzers of the present invention produce improvements over the single-wave plate elliptic analyzer of FIGURE 1 in two ways. First, the optimum effective retardation can be established at a plurality of wave lengths, so that white or polychromatic light can be used without reducing sensitivity. Second, the phase of the photocell output signal will be independent of wavelength.

If desired, to compensate for polarization sensitivity of the photocell or photomultiplier receiving light emerging from the rotating elliptical analyzers of the present invention, a quarter-wave plate having its fast or slow axis oriented at an angle of 45° to the polarization plane of the rotating analyzer element may be interposed in the light beam after the emergent face of the analyzer, and preferably joined to the emergent face of that element for rotation therewith. This quarter-wave plate circularly polarizes the light passing from the rotating analyzer assembly to the photocell. Thus, for example, in FIGURE 2, the assembly generally indicated at 21 includes an analyzer 29 and an incident phase-retarding element 27, with a quarter-wave plate 31 having its fast axis, $FA_Q$, oriented at 45° to the polarization plane PP of the analyzer element 29. A similar quarter-wave plate at 45° may be mounted on the emergent face of the analyzer elements of all of the rotating analyzer assemblies of the present invention, thus eliminating the need for such depolarizer elements as the plate 154 shown in FIGURE 6, but it will be most effective with the non-achromatic assemblies having a single retardation plate and shown in FIGURES 1, 2, 3, 4, and 6, unless the quarter-wave element is itself an achromatic quarter-wave retardation element such as assembly 194 in FIGURE 7.

The rotating analyzer assemblies of the present invention are extremely sensitive to particular polarization states of incident polarized light. They are capable of identifying the adjusted positions of the light-modifying elements required to produce a particular circular polarization state within a few thousandths of one degree, for example. These high-precision analyzing assemblies are thus extremely useful in photoelasticity, polarimetry, interference microscopy, spectropolarimetry, automatic recording measurement systems, and the like, as suggested by the various optical systems illustrated in FIGURES 3 through 7. These assemblies are therefore valuable in the study and measurement of the optical characteristics of specimens, and also in optical systems in automatic monitoring and photoelectric control devices.

It will thus be seen from the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention which, as a matter of language, might be said to fall therebetween.

I claim:

1. An achromatic rotating analyzing assembly for use in an optical system employing a beam of polarized light comprehending a predetermined spectral region, said assembly comprising, in combination, a linear analyzer having a polarization plane and an extinction axis at right angles thereto adapted to be interposed in the path of said beam and having an incident face exposed to said beam when so interposed, a plurality of phase-retarding elements positioned before said incident face, said elements including a first birefringent element and a series of second birefringent elements positioned between said first element and said analyzer, said first element being selected to provide approximately one-quarter wavelength retardation for light of a wavelength $\lambda_0$, near the center of said spectral region, each of said second elements being selected to provide approximately one-half wavelength retardation for light of wavelength $\lambda_0$, said first element having its fast axis angularly offset from the extinction axis of said analyzer by a large acute angle, and said second elements having their fast axes respectively angularly offset from the extinction axis of said analyzer by progressively diminishing amounts.

2. The combination defined in claim 1 including two of said second elements having their fast axes offset by angles in the neighborhood of 29.5° and 7° respectively from the extinction axis of said analyzer, said first element having its fast axis angularly offset by an angle in the neighborhood of 67.5° from said extinction axis.

3. An optical system employing polarized light and capable of indicating specific polarization states of said light comprising, in combination, a light source providing a beam of light for passing through said system, a polarizer interposed in said beam and adapted to plane polarize said beam, a substantially transparent specimen interposed in said polarized beam; a rotating analyzing assembly positoned to receive said beam from said specimen and including a linear analyzer element with an incident face exposed to said beam and a phase-retarding element positioned before said incident face, both of said elements being mounted for synchronized rotation; and a photosensitive device, said light beam passing successively through said polarizer, said specimen, and said rotating analyzing assembly to said photosensitive device, whereby fluctuations caused by the rotation of said analyzer assembly in the intensity of said beam emerging from said assembly and incident upon said photosensitive device produce fluctuating electrical output signals from said device indicating the polarization state of said light beam incident upon said rotating analyzing assembly resulting from optical effects produced upon said beam by passage through said specimen.

4. An optical system employing polarized light and capable of indicating specific polarization states of said light comprising, in combination, a light source providing a beam of light for passing through said system, a polarizer interposed in said beam and adapted to plane polarize said beam, a substantially transparent specimen interposed in said beam, a rotating analyzing assembly located to receive said beam after it passes through said specimen and including a linear analyzer element with an incident face exposed to said beam and a phase-retarding element positioned before said incident face providing relative phase retardation of between one-eighth and three-eighths of a wavelength between normally plane polarized components of the light in said beam from said specimen, both of said elements being mounted for synchronized rotation, and a photosensitive device, said light beam passing successively through said polarizer, said specimen, and said rotating analyzing assembly to said photosensitive device, whereby fluctuations caused by the rotation of said analyzing assembly in the intensity of said beam emerging from said analyzing assembly and incident upon said photosensitive device produce fluctuating electrical output signals from said device indicating the polarization state of said light beam incident upon said rotating analyzing assembly resulting from optical effects produced upon said beam by passage through said specimen.

5. An optical system employing polarized light and capable of indicating specific polarization states of said light comprising, in combination, a light source providing a beam of light for passing through said system, a polarizer interposed in said beam and adapted to plane polarize said beam, a quarter-wave retardation element having its fast axis angularly offset by approximately 45° from the polarization plane of said polarizer, a substantially-transparent specimen interposed in said beam, a rotating analyzing assembly positioned to receive said beam from said specimen and including a linear analyzer element with an incident face exposed to said beam and a phase-retarding element positioned before said incident face, both of said elements being mounted for synchronized rotation, and a photosensitive device, said light beam passing successively through said polarizer, said quarter-wave element, said specimen, and said rotating analyzing assembly to said photosensitive device, whereby fluctuations caused by the rotation of said analyzing assembly in the intensity of said beam emerging from said analyzing assembly and incident upon said photosensitive device produce fluctuating electrical output signals from said device indicating the circular polarization state of said light beam incident upon said rotating analyzing assembly resulting from optical effects produced upon said beam by passage through said specimen.

6. The combination defined in claim 5 in which said specimen is mounted to be subjected to loads causing changes in the optical properties of the specimen.

7. The combination defined in claim 6 in which said polarizer is rotatably mounted and calibrated for adjustable orientation in said beam, and in which a servomotor is connected to receive said electrical output signals and is mounted to rotate said polarizer in response to the phase and amplitude of said output signals, whereby the state of circular polarization may be restored and the polarization plane rotation produced by said specimen may be determined.

8. The combination defined in claim 5 in which said specimen is positioned to be subjected to an electrostatic field inducing birefringence in said specimen.

9. An optical system employing polarized light and capable of indicating specific polarization states of said light comprising, in combination, a light source providing a beam of light for passing through said system, a polarizer interposed in said beam and adapted to plane polarize said beam, a substantially transparent specimen interposed in said beam, a variable phase-adjusting element providing selectable amounts of relative phase retardation between normally plane polarized components of the light incident thereon, a rotating analyzing assembly positioned to receive said beam from said phase-adjusting element and including a linear analyzer element with an incident face exposed to said beam and a phase-retarding element positioned before said incident face, both of said elements being mounted for synchronized rotation, and a photosensitive device, said light beam passing successively through said polarizer, said specimen, said phase-adjusting element, and said rotating analyzing assembly to said photosensitive device, whereby fluctuations caused by the rotation of said analyzing assembly in the intensity of said beam emerging from said assembly and incident upon said photosensitive device produce fluctuating electrical output signals from said device indicating the polarization state of said light beam incident upon said rotating analyzing assembly resulting from optical effects produced upon said beam by passage through said specimen.

10. The combination defined in claim 1 in which said specimen is mounted to be subjected to loads causing changes in the optical properties of the specimen.

11. The combination defined in claim 9 in which said specimen is positioned to be subjected to an electrostatic field inducing birefringence in said specimen.

12. The combination defined in claim 9 including a beam-dividing element positioned to divide said polarized beam into two perpendicularly plane polarized component beams, one component beam being directed through said specimen and the other component beam being directed through the surround, and a beam-combining element positioned to recombine said beams, whereby said system is adapted to indicate the polarization state of said recombined beam caused by relative phase retardation introduced by said specimen.

13. An optical system employing polarized light and capable of indicating specific polarization states of said light comprising, in combination, a light source providing a beam of light for passing through said system, a polarizer interposed in said beam and adapted to plane polarize said beam, a substantially-transparent specimen of material having polarization plane rotating characteristics interposed in said polarized beam, a quarter-wave retardation element located in said beam emerging from said specimen and mounted for adjustable orientation of its fast axis to change said beam to a circularly-polarized beam, a rotating analyzing assembly positioned in said circularly-polarized beam and including a linear analyzer element with incident face exposed to said beam and a phase-retarding element positioned before said incident face, both of said elements being mounted for synchronized rotation, and a photosensitive device, said light beam passing successively through said polarizer, said specimen, said quarter-wave element and said rotating analyzing assembly to said photosensitive device, whereby fluctuations caused by the rotation of said analyzing assembly in the intensity of said beam emerging from said assembly and incident upon said photosensitive device produce fluctuating electrical output signals from said device indicating departures from circular polarization of said light beam incident upon said rotating analyzing assembly resulting from polarization plane rotation effects produced upon said beam by passage through said specimen.

14. The combination defined in claim 13 in which said quarter-wave element is rotatably mounted for adjustable orientation in said beam, and in which a servomotor is connected to receive said electrical output signals and is mounted to rotate said quarter-wave element in response to the phase and amplitude of said output signals, whereby the state of circular polarization may be restored and the polarization plane rotation produced by said specimen may be determined.

15. The combination defined in claim 14 in which said quarter-wave element is substantially achromatic, and including a variable monochromator interposed between said light source and said polarizer, and an X-Y recorder connected to plot the adjusted angular orientation of said achromatic quarter-wave element against the wavelength of the light emerging from said variable monochromator, whereby spectropolarimetry measurements may be automatically recorded.

16. The combination defined in claim 15 in which said variable monochromator includes a spectrum-forming element pivotally mounted to direct light of a preselected band of wavelengths to said polarizer.

17. A polarization analyzing assembly for use in an optical system employing a beam of polarized light comprehending a predetermined spectral region, said assembly comprising, in combination, a linear analyzer adapted to be interposed in the path of said beam and having an incident face exposed to said beam when so interposed, a phase-retarding element positioned before said incident face and having its fast axis angularly inclined with respect to the polarization plane of said analyzer, the relative phase-retardation imparted by said element to said beam of polarized light and to the orthogonally related vibrational components thereof when so interposed in said beam being different from an integral number of wavelengths over said spectral region, and means for rotating said analyzer and said phase-retarding element in synchronism when in said beam and about an axis substantially parallel to the path of said beam while maintaining substantially constant said angular inclination therebetween, whereby the transparency of said assembly averaged over a full rotation of said analyzer and said element when in said beam will change with the ellipticity of the light beam incident thereon.

18. A polarization analyzing assembly for use in an optical system employing a beam of polarized light comprehending a predetermined spectral region, said assembly comprising, in combination, a linear analyzer adapted to be interposed in the path of said beam and having an incident face exposed to said beam when so interposed, a phase-retarding element positioned before said incident face and having its fast axis angularly inclined with respect to the polarization plane of said analyzer, the relative phase-retardation imparted by said element to said beam of polarized light and to the orthogonally related vibrational components thereof when so interposed in said beam being different from an integral number of wavelengths over said spectral region, and a rotatable mounting supporting said analyzer and said phase-retarding element and arranged to simultaneously and continuously rotate same in synchronism when in said beam and about an axis substantially parallel to the path of said beam.

19. A polarization analyzing assembly for use in an optical system employing a beam of polarized light comprehending a predetermined spectral region, said assembly comprising, in combination, a linear analyzer adapted to be interposed in the path of said beam and having an incident face exposed to said beam when so interposed and an emergent face, a phase-retarding element positioned before said incident face with its fast axis angularly inclined with respect to the polarization plane of said analyzer, the relative phase-retardation imparted by said element to said beam of polarized light and to the orthogonally related vibrational components thereof when so interposed in said beam being different from an integral number of wavelengths over said spectral region, a quarter-wave retardation plate positioned adjacent the emergent face with its fast axis oriented at an inclination of approximately 45° to the polarization plane of said analyzer, and a rotatable mounting supporting said analyzer, said phase-retarding element and said plate and arranged to simultaneously rotate same in synchronism when in said beam and about an axis substantially parallel to the path of said beam constant said angular inclination therebetween, whereby the transparency of said assembly averaged over a full rotation of said analyzer and said element when in said beam will change with the ellipticity of the light beam incident thereon.

20. A polarization analyzing assembly for use in an optical system employing a beam of polarized light comprehending a predetermined spectral region, said assembly comprising, in combination, a linear analyzer adapted to be interposed in the path of said beam and having an incident face exposed to said beam when so interposed, a phase-retarding element positioned before said incident face and having its fast axis oriented at approximately 45° inclination from the polarization plane of said analyzer, the relative phase-retardation imparted by said element to said beam of polarized light and to the orthogonally related vibrational components thereof when so interposed in said beam being different from an integral number of wavelengths over said spectral region, and means for rotating said analyzer and said phase-retarding element in synchronism when in said beam and about an axis substantially parallel to the path of said beam.

21. The combination defined in claim 20 in which said beam includes light of a wavelength $\lambda$, and in which said phase retarding element is a birefringent plate having a thickness such that it provides relative phase retardation $\phi$ between components of said light respectively plane polarized parallel and normal to said fast axis, where $\phi = A\lambda$, and A is defined by the expression $$\frac{4n-3}{8} \leq A \leq \frac{4n-1}{8}$$

where $n$ is any integer.

22. The combination defined in claim 20 in which said phase-retarding element is a birefringent plate having a thickness such that it provides relative phase retardation of between one-eighth and three-eighths of a wavelength of the light employed in said system between components of said light respectively plane polarized parallel and normal to said fast axis.

23. A polarization analyzing assembly for use in an optical system employing a beam of polarized light of a predetermined wavelength and having an extinction factor E, said assembly comprising, in combination, a linear analyzer adapted to be interposed in the path of said beam and having an incident face exposed to said beam when so interposed, a phase-retarding element having a retardation $\phi$ for light of said wavelength and positioned before said incident face with its fast axis angularly offset from the polarization plane of said analyzer by an angle $\gamma$, the retardation $\phi$ and the angle $\gamma$ being related to said extinction factor E by the equation $$\sin 2\gamma \sin \phi = \frac{\sqrt{E}-1}{\sqrt{E}+1}$$

means for rotating said analyzer and said phase-retarding element when in said beam and about an axis substantially parallel to the path of said beam while maintaining said angle $\gamma$ substantially constant, and a photosensitive electrical element positioned so as to be exposed to light emerging from said analyzer when in said beam, whereby the optical flux transmitted by said assembly and incident upon said photosensitive element averaged over a complete rotation of said analyzer and said phase-retarding element when in said beam will vary with the ellipticity of the light beam incident thereon.

24. The combination defined in claim 23 in which said photosensitive electrical element is constructed and arranged to provide varying electrical signals corresponding to variations in said emerging light when incident thereon, said assembly also including a display means and an amplifier having an input circuit connected to said photosensitive electrical element and an output circuit connected to said display means, whereby said variable signals may be displayed by said display device.

25. A polarization analyzing assembly for use in an optical system embodying a beam of polarized light of a predetermined wavelength, said assembly comprising, in combination, a linear analyzer adapted to be interposed in the path of said beam and having an incident face exposed to said beam when so interposed and an emergent face, a phase-retarding element positioned before said incident face and providing approximately but not exactly one-quarter wavelength phase-retardation for the wavelength of light of said beam and having its fast axis angularly offset from the polarization plane of said analyzer by approximately but not exactly 45°, a quarter-wave retardation plate positioned behind said emergent face with its fast axis oriented at an inclination of approximately 45° to the polarization plane of said analyzer, a rotatable mounting supporting said analyzer, said phase-retarding element and said quarter-wave plate for simultaneously rotating same continuously about an axis substantially parallel to the path of said beam when same are disposed in said beam, a photocell positioned to receive light emerging from said emergent face of said analyzer and passing through said quarter-wave plate when positioned in said system, said photocell being constructed and arranged to provide electrical signals corresponding to the amount of light flux incident thereon, and a recording device having an input circuit connected to said photocell, whereby the electrical signals provided by said photocell in response to light flux incident thereon may be recorded by said recording device.

26. An acromatic rotating analyzing assembly for use in an optical system embodying a beam of polarized light comprehending a predetermined spectral region, said assembly comprising, in combination, a linear analyzer having a polarization plane and an extinction axis at right angles thereto adapted to be interposed in the path of said beam so as to have an incident face exposed to said beam when so interposed, a phase-retarding element including a plurality of phase-retarding plates positioned before said incident face, said phase-retarding plates having their respective fast axes angularly offset by different amounts from the extinction axis of said analyzer, and means for rotating each of said analyzer and said phase-retarding plates when disposed in said beam about an axis substantially parallel to the path of said beam and while maintaining the relative angular orientations therebetween substantially constant.

27. The combination defined in claim 26 in which said analyzer assembly provides a preselected total effective phase retardation $\phi$, and in which said phase-retarding element includes a first birefringent element selected to provide approximately one-quarter wavelength retardation for light of a wavelength $\lambda_0$ near the center of said spectral region, and a second birefringent element selected to provide approximately one-half wavelength retardation for light of wavelength $\lambda_0$, said first and second elements having their fast axes respectively angularly offset from the extinction axis of said analyzer element by the angles $\beta_1$ and $\beta_2$, with $$\tan \beta_2 = 2\frac{\sin J}{\sin \phi} \pm \sqrt{4\frac{\sin^2 J}{\sin^2 \phi} - 1}$$

$$\tan (\beta_1 - \beta_2) = 2 \sin J \tan \frac{\phi}{2} - \tan \beta_2$$

where J is the phase retardation provided by said first element for light of a preselected wavelength $\lambda_1 \neq \lambda_0$.

28. The combination defined in claim 27 in which said preselected total effective phase retardation $\phi$ is related to the extinction factor E of the optical system by the equation $$\sin \phi = \frac{\sqrt{E}-1}{\sqrt{E}+1}$$

29. An achromatic phase-retarding assembly for use in an optical system employing a beam of polarized light comprehending a predetermined spectral range and designed to convert said light between one and the other of two polarization states at each of at least two different incident wavelengths $\lambda_1$ and $\lambda_2$ within said range, one of said state being plane polarization and the other being a preselected particular elliptical polarization, said assembly comprising, in combination, a linear analyzer having a polarization plane and an extinction axis at right angles thereto, and a plurality of phase-retarding elements disposed in adjacent optically aligned relation to each other and fixedly secured to the incident face of said analyzer so as to have their incident faces serially arranged in and perpendicular to the path of said beam of polarized light when in said optical system, each of said elements being made of birefringent material having substantially the same optical properties and having an angle between their respective fast axes which is not equal to 90°, said plurality of phase-retarding elements including a first birefringent element providing approximately one-quarter wavelength retardation for light of a wavelength $\lambda_0$ intermediate said spaced wavelength $\lambda_1$ and $\lambda_2$ and near the center of said spectral range, and a second birefringent element providing approximately one-half wavelength retardation for light of wavelength $\lambda_0$, said first and second birerefringent elements having their fast axes, respectively, angularly offset from the extinction axis of said analyzer by the angles $\beta_1$ and $\beta_2$ which are different from 90°, with $$\tan \beta_2 = 2 \frac{\sin J}{\sin \phi} \pm \sqrt{4 \frac{\sin^2 J}{\sin^2 \phi} - 1}$$

and $$\tan (\beta_1 - \beta_2) = 2 \sin J \tan \frac{\phi}{2} - \tan \beta_2$$

and wherein $J$ is the phase-retardation provided by said first element for light of said predetermined wavelength $\lambda_1$, and with $\lambda_1 \neq \lambda_0$, and $\phi$ is the preselected total phase-retardation provided by said assembly.

References Cited by the Examiner
UNITED STATES PATENTS

| | | | |
|---|---|---|---|
| 2,270,323 | 1/42 | Land et al. | 88—65 |
| 2,347,582 | 4/44 | Ulffers | 88—65 |
| 2,418,964 | 4/47 | Arenberg | 88—65 X |
| 2,420,273 | 5/47 | West | 88—65 |
| 2,441,049 | 5/48 | West | 88—65 |
| 2,503,808 | 4/50 | Earl et al. | 88—14 |
| 2,527,593 | 10/50 | Stadler | 88—65 |
| 2,583,186 | 1/52 | Mueller | 88—14 |
| 2,591,701 | 4/52 | Jaffe | 88—65 X |
| 2,607,272 | 8/52 | Bond | 88—65 |
| 2,877,683 | 3/59 | Fischer | 88—14 |
| 2,976,764 | 3/61 | Hyde et al. | 88—14 |

JEWELL H. PEDERSEN, *Primary Examiner.*
EMILE G. ANDERSON, *Examiner.*